United States Patent [19]

Wang

[11] Patent Number: 4,662,226

[45] Date of Patent: May 5, 1987

[54] PRESSURE TRANSDUCER

[76] Inventor: Desheng Wang, 12 Yiang Qiao, Yong Ding Men Wai Street, Beijing, China

[21] Appl. No.: 695,895

[22] Filed: Jan. 29, 1985

[51] Int. Cl.⁴ .............................. G01L 7/08; G01L 9/10
[52] U.S. Cl. ..................................... 73/728; 29/157 R; 29/454; 29/602 R; 73/73; 73/784; 336/30
[58] Field of Search ................... 73/784, 73, 728, 722, 73/706, 386, 387, 35; 336/30; 29/602 R, 157 R, 454

[56] References Cited

U.S. PATENT DOCUMENTS

| | | | |
|---|---|---|---|
| 2,683,989 | 7/1954 | Clark | 73/722 |
| 4,102,209 | 7/1978 | Brahm | 73/702 |
| 4,149,422 | 4/1979 | Olsen et al. | 73/704 |
| 4,409,816 | 10/1983 | Yamaguchi et al. | 73/35 |
| 4,424,705 | 1/1984 | Hattori et al. | 73/728 |

FOREIGN PATENT DOCUMENTS

| | | |
|---|---|---|
| 1478315 | 6/1977 | United Kingdom . |
| 694779 | 10/1979 | U.S.S.R. . |
| 924530 | 4/1982 | U.S.S.R. . |
| 973702 | 11/1982 | U.S.S.R. . |

Primary Examiner—Donald O. Woodiel
Attorney, Agent, or Firm—Hill, Van Santen, Steadman & Simpson

[57] ABSTRACT

A pressure-measuring transducer device for transforming a change of tested pressure into a change of output signal frequency. Variable reluctance sensing elements and an FM IC block are assembled together in a base. The transducer device can have a variety of configurations and external forms and is sturdy and reliable, tightly sealed, interference resistant, and adapted for use in measuring dynamic and static pressures of different mediums. The pressure transducer has a piston type double film, and the base is made of aluminum alloy and is "honeycombed". The specific gravity is approximately equal to that of soil. It is adapted for measuring soil pressure or boundary soil pressure of reinforced concrete structure and pressure of loose solid substances. An alternate embodiment is used for measuring pore pressure in soil. Several forms of filtering devices are provided. A liquid pressure transducer can be used for measuring liquid pressure in liquid and for measuring positive or negative pressure in gas, if the filtering device is removed.

29 Claims, 10 Drawing Figures

PRESSURE TRANSDUCER

BACKGROUND OF THE INVENTION

The invention relates to a pressure measuring device, specifically a pressure transducer which transforms a pressure change being tested into a change of output signal frequency.

In the prior art, the pressure transducer of the electrical resistance strain gage type which is extensively used for measuring the internal pressure of soil and other loose solid substances, and for measuring interface pressure of reinforced concrete structures to which it is contacted, transforms the pressure change into a change of output resistance, and then into a change of electrical bridge output voltage. This type of AM transducer has the following disadvantages: low output signal amplitude, low S/N ratio, low anti-interference capability, a measured accuracy which is affected by the voltage of the power supply of the electrical bridge and by the length of the transmission cable, a zero point drift which occurs with changes of time and ambient temperature, and not being adapted for long-term operation and telemetry.

Another type of pressure transducer which is extensively used is known as a vibrating string type. It measures pressure change by transforming the pressure change tested into a change of vibration frequency of the string which is fixed between the base of the transducer and the film. It is a transducer of FM (frequency modulation) type having advantages of high stability and high anti-interference capability. Nevertheless, it has the disadvantages of low sensitivity, rather great non-linear error, it processes test data inconveniently, tested dynamic pressure waveforms are liable to be distorted, and its geometric configuration and weight are hardly in accordance with the requirements of internal pressure and dynamic pressure of solid substances like soil.

SUMMARY OF THE INVENTION

The invention has the structure of a piston type double film, and the FM principle with a variable magnetic reluctance is employed. Its features are as follows. The reluctance sensing elements, like an oscillatory circuit L-C composed of an inductor L, a resonant capacitor C, and an IC block are assembled together in a "honeycomb" shaped round base forming in the variable reluctance FM pressure transducer of the invention. The output signal frequency of the pressure transducer is modulated by the pressure tested. The advantages are: high signal amplitude, great S/N ratio, high anti-interference capability, high measuring accuracy—and is not effected at least to within a ±25% increment of a rated voltage of the power supply, or by a cable length of up to 1,000 m. It is adapted to be used in telemetry under wet conditions. Round cavities in which are assembled sensing elements, capacitors and IC blocks, is filled with solidified chemical substances, like epoxy resin, which are capable of sealing both tightly and firmly. Therefore, it is shock-proof, waterproof, and of great reliability. A variable reluctance sensing element of the device is made from a ferrite alloy serving as a magnetic material with high elasticity. In this invention, the ferrite alloy material is preferably Ni50W2TiAl and is easily machined either from a whole piece or by welding or adhering together pre-punched pieces which are made by particular molds with a given corrugation pattern. Therefore, the linear range of measurement is widened. The advantages for the pressure transducer are: high sensitivity, wide measurement range, short lagging effect, fine linearity, and repeatability. By using a light alloy and "honeycomb" base, in this first embodiment the specific weight of the soil pressure transducer is decreased to 2.2 g/cm$^3$ or so, approximately equal to that of the soil, thus fulfilling the matching requirement of dynamic stress measurement in soil.

Using capacitors of various temperature coefficients, errors of the measured results caused by the change of temperature can be compensated to make the zero point stable, thus adapting the device to long-term observation. When the pressure transducer is connected to a receiver, such as a digital frequency meter, the data is easily processed by mini-computer. In this case, the pressure transducer is a digital type, and no A/D conversion is needed.

DESCRIPTION OF THE PREFERRED EMBODIMENTS

Figure 1:
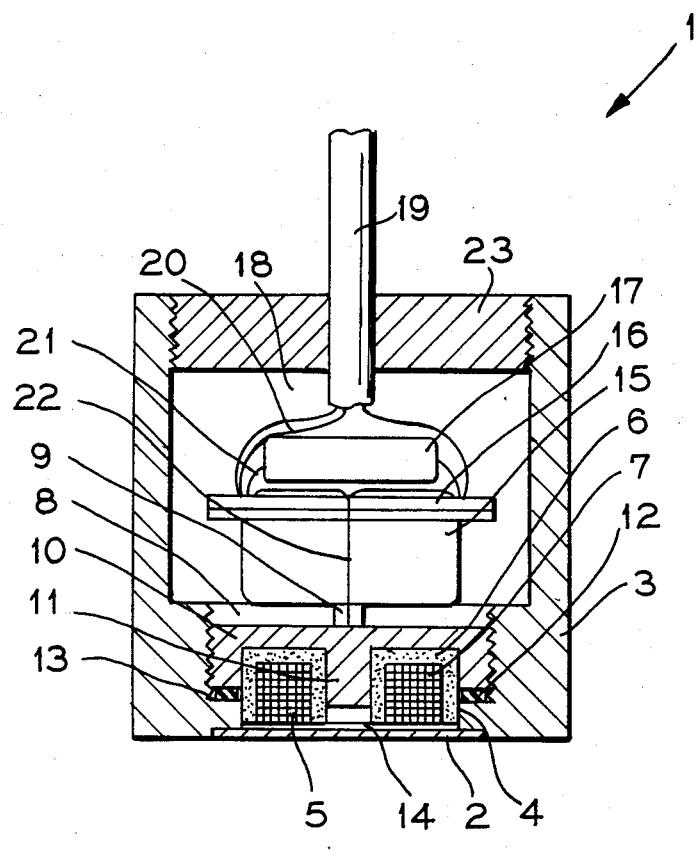
FIG. 1 is a schematic illustration of the pressure transducer of the invention.

FIG. 1 is a schematic diagram for the pressure transducer 1 of the invention. Elastic magnetic film is laid in a ringlike channel 4 under base 3. It is bonded firmly by welding or a chemical gluing agent. Coil 5 without a bobbin is firmly fitted in ringlike channel 7 of cylinder-shaped core 6 having a V-shaped cross-section, which is mounted in core base 10 that has two slots 8 and small holes 9, thus forming a magnetic material module 11 comprising ferrite. Washer 12 usually made of copper foil is placed in a central threaded hole 13 in base 3 so that the gap between core 6 and film 2 can be adjusted. Ferrite module 11 is screwed into the threads of base 3. IC block 15, (see FIG. 6), circuit board 16, and condenser 17 are assembled together in cavity 18 on the transducer. Cores 20 of cable 19, leads 22 of coil 5, and leads 21 of condenser 17 are soldered together with circuit board 16 on IC block 15. Cavity 18 is cleaned and is filled with chemical insulating material, such as epoxy resin, to be solidified. Then back cover 23 is put on. In this fashion the variable reluctance FM pressure transducer is thus constructed. The transducer can be used for measuring static and dynamic, positive and negative pressures. When elastic magnetic film 2 is acted upon by positive pressure, an inward deformation is produced, decreasing gap 14 between film 2 and core 6. Thus reluctance is decreased and inductance is increased so that the frequency of the oscillatory circuit formed of coil 5, condenser 7 and IC block 15 is decreased. When film 2 is acted upon by negative pressure, an outward deformation is produced, increasing gap 14, increasing reluctance, decreasing inductance, and increasing the frequency of the output signal.

Through proper adjusting, the relationship between the frequency of the output signal and the change of the pressure tested will have good linearity.

Figure 2:
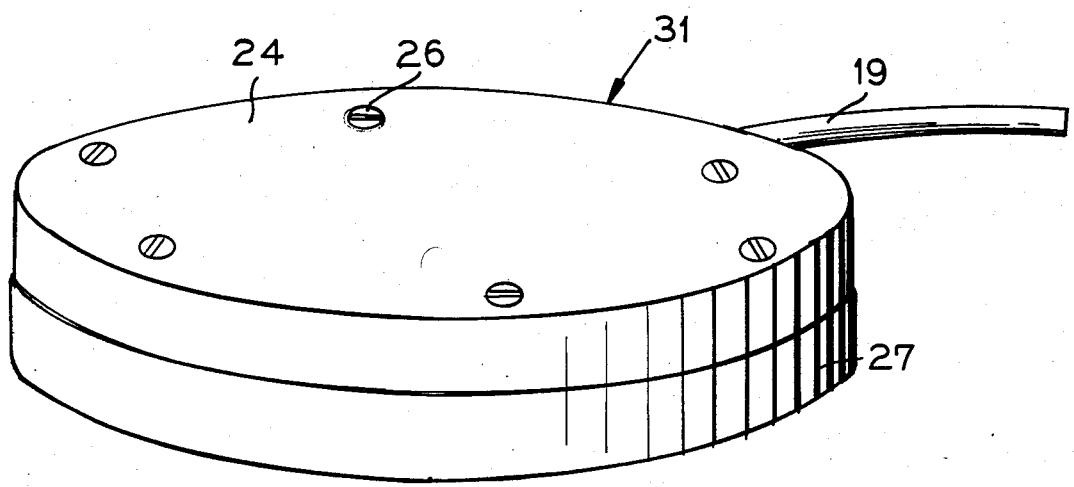
FIG. 2 is an external perspective view of a soil pressure transducer of the invention.

FIG. 2 is a perspective view of a soil pressure transducer 31. Back cover 24 is fixed by screws 26 on the base. The power supply, receiver, and transducer are connected electrically by cable 19. Elastic guard sheath 27 protects the piston clearance from any intruding object.

Figure 3:
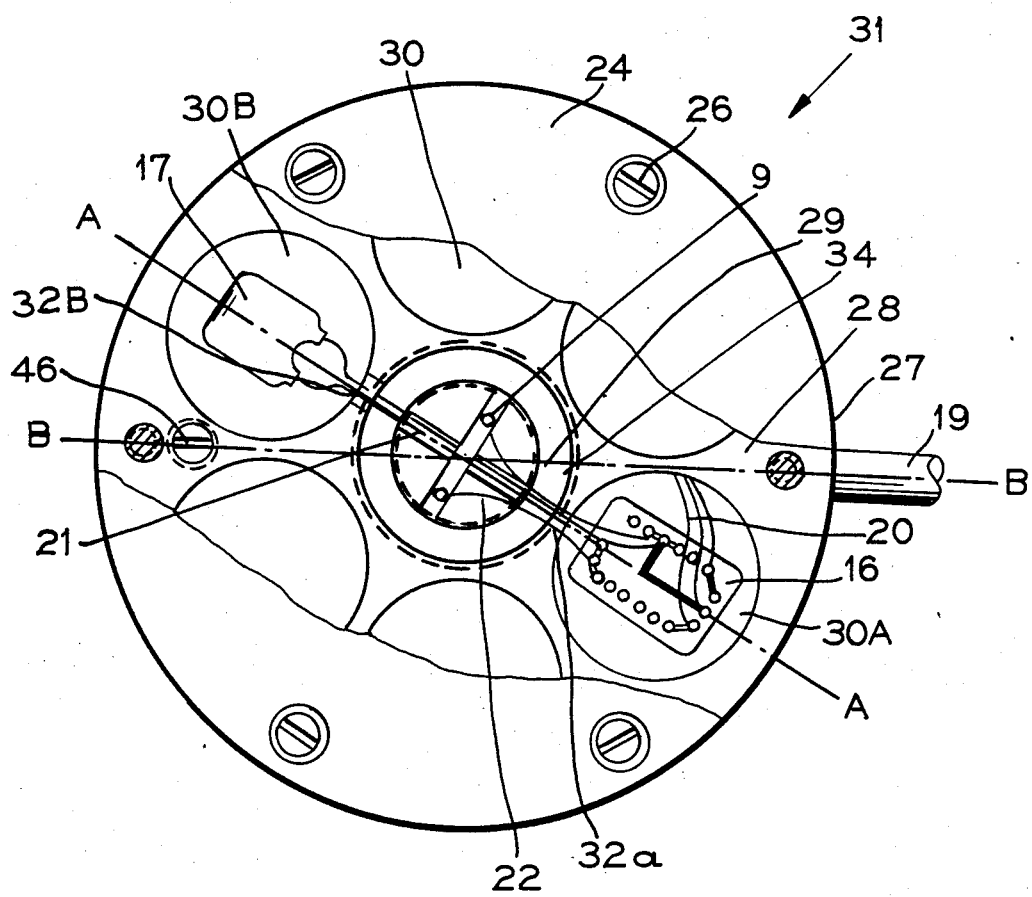
FIG. 3 is a vertical view of the transducer of FIG. 2 but with the top removed.

FIG. 3 is a portion of a top view of the device of FIG. 2. In the center of round outer base 28 made of a rigid material such as aluminum alloy, steel, or stainless steel, there is hole 29 surrounded with a number of round cavities or recesses 30 that make outer base 28 "honeycombed". Therefore, the weight of the transducer can be decreased resulting in quality matching, and some other components of the transducer can be put in the channel as well. Circuit board 16 is mounted on IC (integrated circuit) block 15. After soldering, the block is put in a cavity or recess 30A near cable hole 47, the capacitor 17 being put in another cavity or recess 30B on the opposite side. The leads of condenser 17 and the other components are put in channels 32A and 32B between the two cavities 30A, 30B and central aperture or hole 29.

Figure 4:
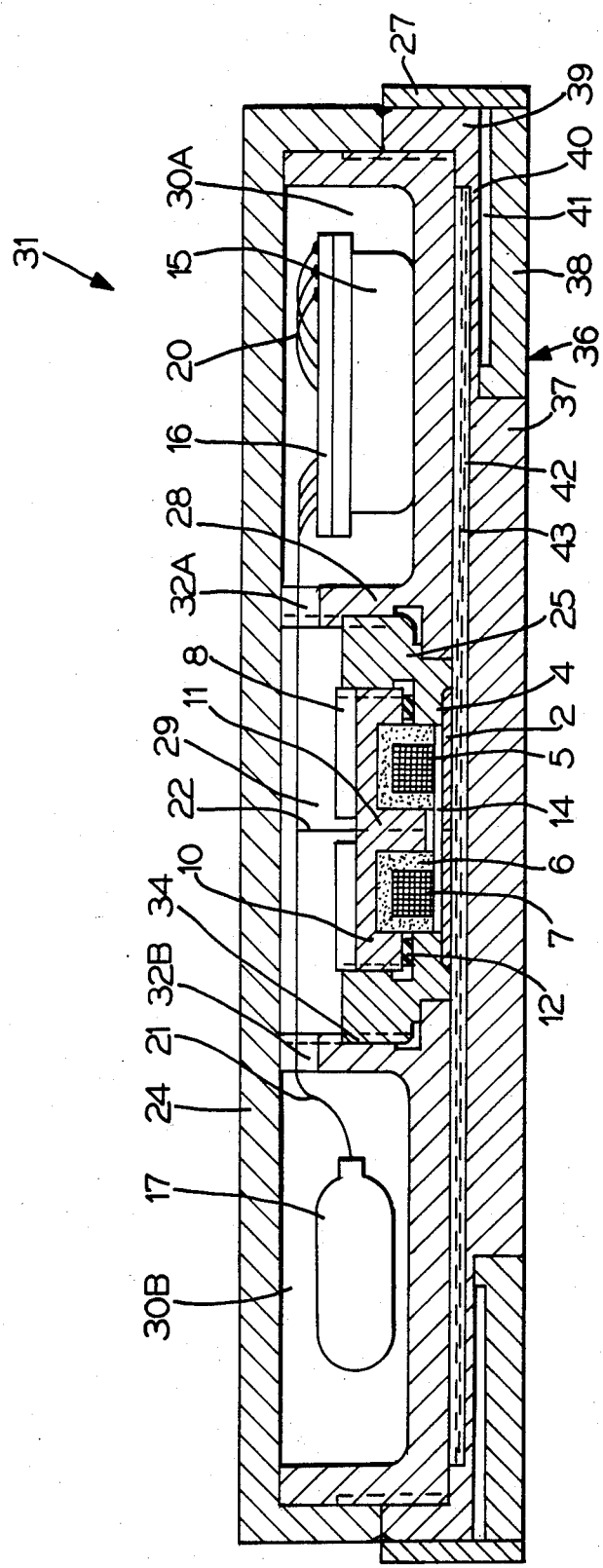
FIG. 4 is a sectional view along line A—A in FIG. 3.

FIG. 4 is a sectional view along line A—A in FIG. 3. Under film casing or inner base 25 made of stainless steel or steel, there is ringlike channel 4, the depth of which corresponds to the thickness of film 2. Film 2 is made of a high elasticity ferrite alloy foil of different thicknesss. Ni50W2TiAl is the best, in order to provide several measured ranges for the transducer.

The round film is punched by proper molds and after being heat treated is laid in ringlike channel 4 of a base 25 functioning as a film casing or inner base 25. Using proper methods, such as welding or chemical adherence, film 2 is firmly bonded together with film casing or inner base 25. Then corresponding corrugations are pressed on the film 2 by specially made molds and pressure devices in order to expand its linear range for measurement. The coil without a bobbin 5 is adhered by a chemical gluing agent and is laid in ringlike channel 7 coated with a binding agent of cylinder-shaped core 6, and thus is firmly attached. Then core 6 is put in core base 10 and firmly bonded. Leads to coil 5 are run through the two holes 9 of slot 8 on core base 10. A ferro-module 11 is formed which includes core base 10, coil 5, and core 6. Ferro-module 11 is screwed into threads of film casing 25, such that a clearance or gap 14 between core 6 and film 2 is provided. Washers 12 of different thickness formed of copper foil or a rigid material are used to adjust clearance or gap 14 until the optimum values of both linearity and sensitivity are obtained. Thus a variable reluctance sensing element 34 has been formed of a coil 5, a core 6, a core base 10, washers 12, film 2, and film casing 25. After sensing element 34 and entrance hole 29 of base 28 are cleaned and heated to 60° C. or so, epoxy resin is painted on the threads. Then sensing element 34 is screwed into the threads of central hole 29 of base 28 and solidified in accordance with resin technology. A ringlike film front cover 36 of a piston type style and usually made by steel, aluminum alloy, or stainless steel, is composed of a pressure bearing member 37, ringlike elastic film 40, peripheral mounting portion 39 with side threads, and ringlike sensing piece 38. A ringlike gap 41 formed between the ringlike elastic film 40 and the ringlike sensing piece 38 is called a piston gap. Threads of front cover 36 are matched to surrounding threads of base 28.

When assembled, base 28 and front pressure bearing member 37 are cleaned and heated to about 60° C. On the threads is painted epoxy resin, and the assembly is screwed tight and solidified in accordance with technological requirements. A thin cavity 42 between the lower part of base 28 and the internal face of front cover 36 is filled with proper liquid, such as silicon oil, in order to improve rigidity and sensitivity. Because of ringlike gap 41, when front cover 36 is acted upon by an external force, the pressure bearing board or surface shifts a bit without deformation, thus eliminating a so-called "arch effect" which takes place during measuring of soil pressure.

Figure 5:
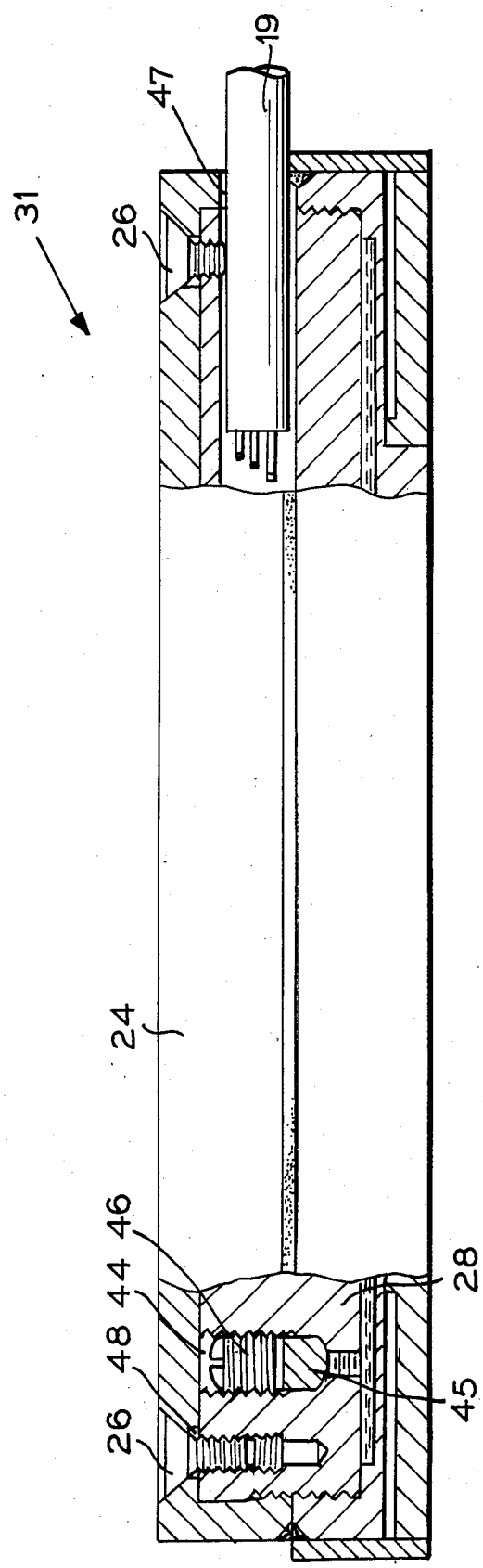
FIG. 5 is a partial sectional view along line B—B in FIG. 3.

FIG. 5 shows part of a sectional view along line B—B in FIG. 3. After oil is poured into an opening in nut 44 on base 28, lead pills 45 are put in which rest at a bottom of nut 44. Then screw 46 is screwed into nut 44 until the lead pills 45 are tightened. A cable hole 47 is provided on the side of base 28 through which cable 19 passes. Core 20 of cable 19 goes into ringlike cavity 30A. After all elements are welded, base 28, the surfaces of the channel, and the hole are cleaned. a chemical insulating substance, such as epoxy resin, is filled into hole 29 in which sensing element 34 is laid, and also into round cavities 30A and 30B in which condenser 17 and IC block 15 are laid. Also channels 32A and 32B and cable hole 47 are filled with a chemical insulating substance, such as epoxy resin, and is solidified in accordance with technological requirements. Finally, the inside of base 28 and back cover 24 is cleaned. The interface between base 28 and back cover 24 and the six nuts 46 are painted with a proper chemical substance, such as epoxy resin or silicon rubber resin. Back cover 24 is fixed on base 28 with screw 26. The material of back cover 24 is the same as that of front cover 36.

Figure 6:
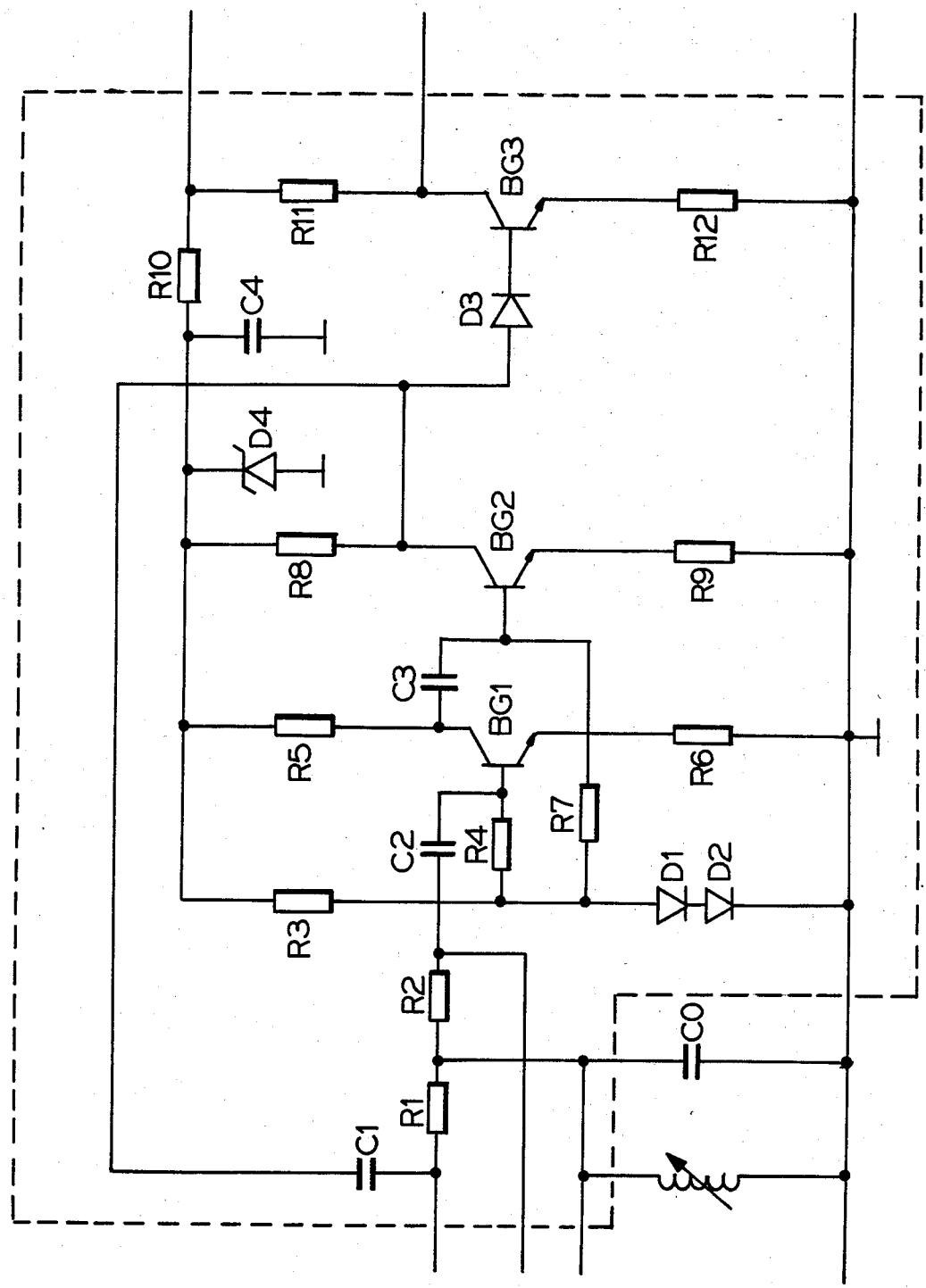
FIG. 6 is a circuit diagram of an IC block employed with the invention.

FIG. 6 is a circuit diagram of IC block 16 which is of high reliability and stability because of the stability and protection measures employed. No changes are needed for the measured results given a supply voltage 9 up to 15 V and for cable lengths up to 1000 m. While operating, if front cover 36 is acted upon by a pressure to be tested, ringlike elastic film 40 will deform a bit. The pressure is transformed to elastic magnetic film 2 through oil such as silicon oil 43, producing a deformation of film 2. Gap 14 between film 2 and core 6 and the reluctance in the magnetic circuit are changed by the deformed magnetic elastic film. Therefore, the inductance of coil 5 is changed, finally causing the change of output frequency of the oscillator circuit composed of IC block 15, coil 5, and condenser 17. By detecting the change of output signal frequency through use of a frequency meter, the magnitude and the change of pressure to be tested is known. If the dynamic pressure is required to be tested, a discriminator/recorder may be used to take down the deformed waveforms. If a minicomputer handles the data, no A/D conversion is needed.

Figure 7:
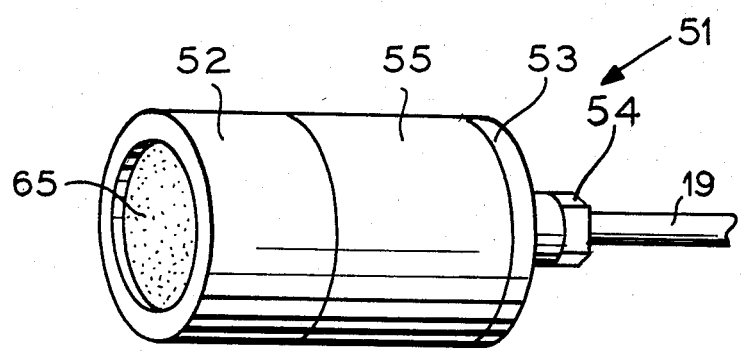
FIG. 7 is an external perspective view of a pore pressure transducer with a front cover having one hole.

FIG. 7 is an external view of a pore pressure transducer 51. Front cover 52 is attached with back cover 53 by threads on base 55. Cable 19 is pressed on back cover 53 by screw 54 with a hole.

Figure 8:
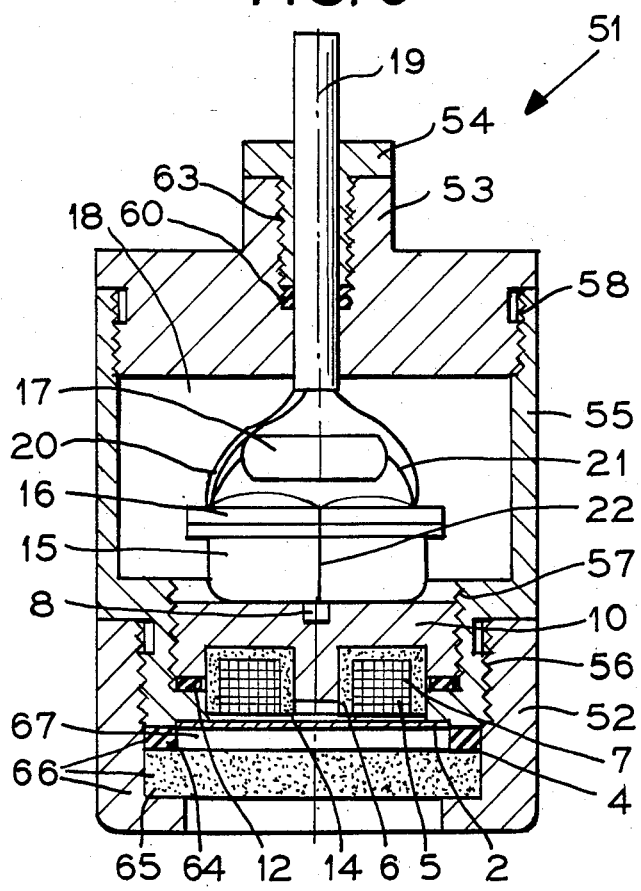
FIG. 8 is a sectional view of the pore pressure transducer illustrated in FIG. 7.

FIG. 8 is a sectional view of transducer 51 shown in FIG. 7. There are threads 56, 57, and 58 on base 55 made of stainless steel or steel, and which are respectively matched with front cover 52, core base 10, and back cover 53 made of the same material or an aluminum alloy. In the end of threads 56 of base 55, there is a ringlike channel 4. Elastic magnetic film 2 of various thicknesses is made of the best ferrite alloy material and of high elasticity, with Ni50W2TiAl being the best. This is laid in ringlike channel 4. It is bonded firmly by an appropriate method, say by welding or chemically adhering, and proper corrugations are pressed on film 2 by specially made molds and pressing devices. If it is necessary to test a large pressure, it is better to machine base 55 together with film 2, and to make it with a high elasticity ferrite alloy material as a whole. Coil 5 without a bobbin is required and is mounted in ringlike channel 7 of ring-shaped magnetic core 6 mounted in core base 10 having slot 8. There is a gap 14 between core 6 and film 2. Washers 12 of different thickness made of copper foil or some kind of rigid material are inserted beneath threads 57. Core base 10 is screwed into threads 57 of base 55 until the optimum values of linearity and gap 14 sensitivity are obtained. Having been assembled by welding, circuit board 16 and IC block 15 are mounted together with condenser 17 in upper part 18 on base 55. Then leads 22, 21, and 20 of coil 5, condenser 17, and cable 19 are correspondingly soldered on circuit board 16. The specification and type of condenser 71 can be determined based upon central frequency and temperature compensation factors.

The following technique is employed for waterproofing. The components visible in cavity 18 and the side wall are cleaned and heated to 60° C. or so. Cavity 18 is filled with chemical insulating material to be solidified, say epoxy resin, and back cover 53, sealing rubber ring 60, and screw 54 with a hole are encased at the end of cable 19 before the material is solidified. The screw of back cover 53 is tightened in threads 58 of base 55. Screw 54 is screwed into threads 63 of back cover 53. Rubber ring 60 is pressed and cable 19 is clamped and sealed tightly. Finally, filtering device 66 formed of a rubber ring 64, filtering piece 65, and front cover 52, are screwed into threads 56 of base 55.

The pore pressure transducers can be used for measuring liquid pressure in liquid and for measuring positive or negative pressure in gas, if the filtering device 66 is removed.

Figure 9:
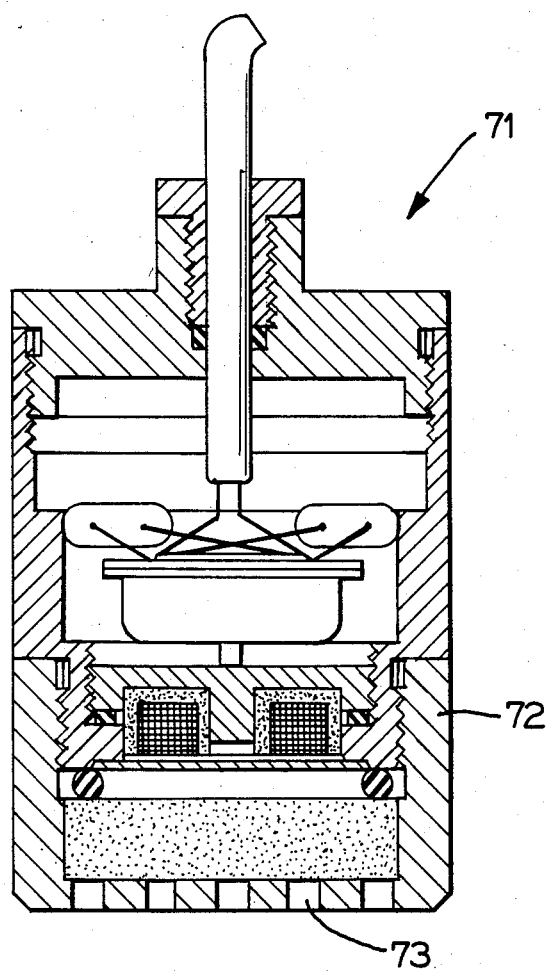
FIG. 9 is a sectional view of the pore pressure transducer with a front cover having pores.

FIG. 9 is a sectional view of another type of water hole pressure transducer 71, of which the difference from the one 51 shown in FIG. 8 only lies in that front cover 72 has many small holes 73.

Figure 10:
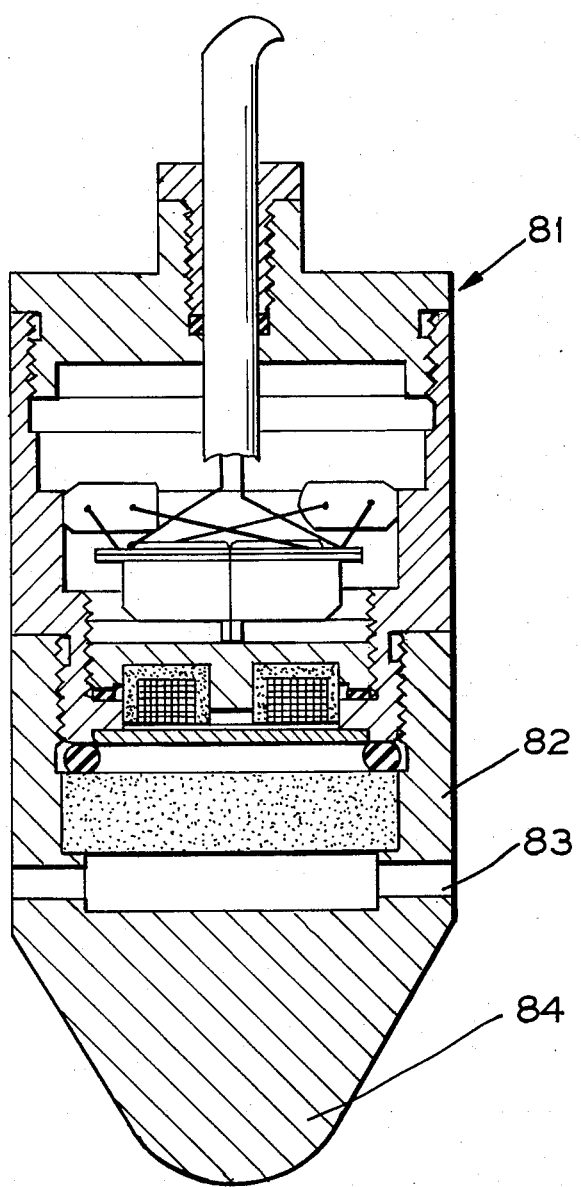
FIG. 10 is a sectional view of the pore pressure with the front cover having a conical-spherical head.

FIG. 10 is a sectional view of another pore pressure transducer 81, wherein a difference from the one 51 shown in FIG. 8 is that there are many holes 83 on an outside periphery of front cover 82, and a conical-spherical head 84 is provided. This facilitates construction.

Although various minor changes and modifications might be suggested by those skilled in the art, it will be understood that I wish to include within the claims of the patent warranted hereon all such changes and modifications as reasonably come within my contribution to the art.

I claim as my invention:

1. A pressure transducer, comprising:
    a base;
    an elastic magnetic film on the base;
    a magnetic core base;
    a shaped magnetic core having a ring-like channel mounted to the core base;
    a coil in the ring-like channel of the magnetic core;
    the core being mounted to the base and a gap being formed between the elastic magnetic film and magnetic core;
    means for adjusting the gap by selective movement of the core base relative to the base and means for maintaining a desired gap setting;
    a condenser;
    an FM (frequency modulation) circuit means electrically connected to the coil and condenser so that when the elastic magnetic film deforms through pressure application, a corresponding change of inductance of the coil results causing the FM circuit means to produce an output signal whose frequency changes so that by testing the change of frequency, a change of the value of the pressure applied can be obtained.

2. A transducer according to claim 1 wherein said FM circuit means comprises an integrated circuit block.

3. A transducer according to claim 1 wherein said base functions as a film casing or inner base and comprises a material selected from the group consisting of stainless steel, steel, and ferrite alloy materials.

4. A pressure transducer comprising:
    a base;
    an elastic magnetic film on the base;
    a magnetic core base;
    a ring shaped magnetic core having a ring-like channel mounted to the core base;
    a coil in the ring-like channel of the magnetic core;
    the core base being mounted to the base and a gap being formed between the elastic magnetic film and magnetic core;
    a condenser;
    an FM (frequency modulation) circuit means electrically connected to the coil and condenser so that when the elastic magnetic film deforms through pressure application, a corresponding change of inductance of the coil results causing the FM circuit means to produce an output signal whose frequency changes so that by testing the change of frequency, a change of the value of the pressure applied can be obtained; and
    on said base a piston type ring-like film front cover means being mounted for adapting the transducer for soil pressure testing.

5. A transducer according to claim 4 wherein said piston type ring-like film front cover means comprises a pressure bearing member and a ring-like pressure sensing piece.

6. A transducer according to claim 5 wherein said pressure bearing member has a thicker central portion as a pressure bearing surface, a thinner ring-like portion of elastic film, and a peripheral mounting portion with threads engageable with threads in a central aperture in the base.

7. A transducer according to claim 5 wherein the ring-like pressure sensing piece and pressure bearing member are press fitted to one another.

8. A transducer according to claim 4 wherein a central aperture is provided in a center of said base.

9. A transducer according to claim 4 wherein round cavities are provided in said base.

10. A transducer according to claim 4 wherein a piston clearance or gap is formed between a ring-like pressure sensing piece and an elastic film portion of said front cover means.

11. A transducer according to claim 4 wherein an enclosed cavity is formed between the elastic film and base and said piston-type ring-like film front cover means.

12. A transducer according to claim 11 wherein said enclosed cavity is filled with transmission liquid.

13. A transducer according to claim 12 wherein said transmission liquid comprises silicon oil.

14. A transducer according to claim 4 wherein washer spacer means are placed at a bottom of a central aperture of the base functioning as a film casing supporting the elastic magnetic film, and wherein the base has thread means for adjustably mounting the core base in the base central aperture so that a gap whose dimension is set by the spacer means is formed.

15. A transducer according to claim 2 wherein an outer base is provided which receives said base, a back cover is provided which mates with said front cover means, and wherein said outer base, front cover means, back cover and core base comprise an element selected from the group consisting of aluminum alloy, steel, and stainless steel.

16. A pressure transducer comprising:
a base;
an elastic magnetic film on the base;
a magnetic core base;
a ring shaped magnetic core having a ring-like channel mounted to the core base;
a coil in the ring-like channel of the magnetic core;
the core base being mounted to the base and a gap being formed between the elastic film and magnetic core;
a condenser;
an FM (frequency modulation) circuit means electrically connected to the coil and condenser so that when the elastic magnetic film deforms through pressure application, a corresponding change of inductance of the coil results causing the FM circuit means to produce an output signal whose frequency changes so that by testing the change of frequency, a change of the value of the pressure applied can be obtained; and
a filtering device means being provided on the base for blocking solid substances for adapting the transducer for liquid pressure testing.

17. A pressure transducer, comprising:
a base;
an elastic magnetic film on the base;
a magnetic core base;
a ring shaped magnetic core having a ring-like channel mounted to the core base;
a coil in the ring-like channel of the magnetic core;
the core base being mounted to the base and a gap being formed between the elastic magnetic film and magnetic core;
a condenser;
a FM (frequency modulation) circuit means electrically connected to the coil and condenser so that when the elastic magnetic film deforms through pressure application, a corresponding change of inductance of the coil results causing the FM circuit means to produce an output signal whose frequency changes so that by testing the change of frequency, a change of the value of the pressure applied can be obtained; and
the elastic magnetic film being a high elastic ferrite alloy material.

18. A transducer according to claim 17 wherein the high elastic ferrite alloy material comprises Ni50W2-TiAl.

19. A pressure transducer, comprising:
a base having a central aperture therein, and a relatively smaller diameter aperture in a floor of the central aperture and at an end of which opposite the floor an elastic magnetic film is mounted;
a magnetic core base engageable in the central aperture;
a magnetic core mounted to the magnetic core base;
a coil associated with the magnetic core;
a gap formed between the core and the elastic magnetic film;
spacing means for adjusting said gap between the core and film; and
FM circuit means electrically connected to the coil for detecting a change of inductance of the coil as a result of pressure applied to the elastic magnetic film.

20. A method for manufacturing a pressure transducer, comprising the steps of:
providing a sensing element formed of an inner base, an elastic magnetic film mounted across an aperture in the inner base, and a core base containing a core and coil mounted within the inner base such that a gap is formed between the core and the elastic magnetic film;
providing an outer base having an aperture in which the inner base is received;
painting threads in the outer base aperture with a sealant and then threading the sensing element inner base into the aperture of the outer base such that it is sealed there;
providing a piston type front cover which receives the outer base and sensing element, a cavity being formed between the outer base and inner base and the piston-type front cover;
vacuumizing the cavity and filling it with oil;
providing in the outer base a filling aperture in communication with the cavity and filling the cavity with the oil through the filling aperture;
sealing the filling aperture;
providing a condenser and an FM circuit device, placing them in at least one aperture in the outer base, and sealing them there;
placing a back cover over the outer base which mates with the front cover; and
applying a waterproof layer over the front and back covers.

21. A method according to claim 20 wherein the aperture in the outer base which receives the sensing element is painted with an epoxy resin.

22. A method according to claim 20 wherein the FM circuit device and condenser are sealed with epoxy resin.

23. A method according to claim 20 wherein the back cover and front cover are painted with a silion rubber resin.

24. A method according to claim 20 including the step of connecting the back cover to the outer base with at least one screw.

25. A method according to claim 20 including the step of sealing the filling aperture by placing pills of a sealing material in the filling aperture and threading a screw in the fitting aperture.

26. A method for manufacturing a pressure transducer comprising the steps of:
   providng a sensing element formed of a base, an elastic magnetic film mounted across an aperture in the base, and a core base containing a core with a coil mounted within the aperture in the base such that a gap is formed between the core and the elastic magnetic film with the core base mounted in the base;
   providing said base with a cavity above the core base;
   providing a filtering device adjacent the elastic film for blocking solid substances;
   providing a condenser and an FM circuit device with a cable, placing them in said base cavity and sealing the cavity by filling it with a sealant;
   after the sealant has solidified, placing a back cover rubber ring and screw member having a hole onto the cable in succession from an end thereof; and
   then the back cover is attached to the base above the cavity and the screw member is tightened in an aperture in the back cover.

27. A pressure transducer, comprising:
   a base having a central aperture passing completely therethrough, and at least one cavity outwardly of the central aperture;
   an elastic magnetic film on the base;
   a magnetic core base;
   a ring shaped magnetic core having a ring-like channel mounted to the core base;
   a coil in the ring-like channel of the magnetic core;
   the core base being mounted to the base in the central aperture and a gap being formed between the elastic magnetic film and magnetic core;
   a condenser; and
   an FM (frequency modulation) circuit means received in the outer cavity and electrically connected to the coil and condenser so that when the elastic magnetic film deforms through pressure application, a corresponding change of inductance of the coil results causing the FM circuit means to produce an output signal whose frequency changes so that by testing the change of frequency, a change of the value of the pressure applied can be obtained.

28. A transducer according to claim 27 wherein a plurality of outer cavities surround the central aperture to create a honey-comb effect and lighten the overall transducer.

29. A pressure transducer, comprising:
   a base;
   an elastic magnetic film on the base comprising Ni50W2Al;
   a magnetic core base;
   a ring shaped magnetic core having a ring-like channel mounted to the core base;
   a coil in the ring-like channel of the magnetic core;
   the core base being mounted to the base and a gap being formed between the elastic magnetic film and magnetic core;
   means for adjusting the gap by moving the core base relative to the base;
   a condenser; and
   an FM (frequency modulation) circuit means electrically connected to the coil and condenser so that when the elastic magnetic film deforms through pressure application, a corresponding change of inductance of the coil results causing the FM circuit means to produce an output signal whose frequency changes so that by testing the change of frequency, a change of the value of the pressure applied can be obtained.

* * * * *